US008760050B2

(12) United States Patent
Mohr et al.

(10) Patent No.: US 8,760,050 B2
(45) Date of Patent: Jun. 24, 2014

(54) ENERGY SWITCH ASSEMBLY FOR LINEAR ACCELERATORS

(75) Inventors: Stephen Mohr, Danville, CA (US); Christopher Patane, San Mateo, CA (US); David H. Whittum, Sunnyvale, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 434 days.

(21) Appl. No.: 12/568,621

(22) Filed: Sep. 28, 2009

(65) Prior Publication Data

US 2011/0074288 A1 Mar. 31, 2011

(51) Int. Cl.
*H01J 25/10* (2006.01)
*B23P 11/00* (2006.01)
*B23P 19/00* (2006.01)

(52) U.S. Cl.
USPC ............................... 315/5.41; 29/428; 29/700

(58) Field of Classification Search
USPC ........................................................ 315/5.41
See application file for complete search history.

(56) References Cited

U.S. PATENT DOCUMENTS 3,398,376 A * 8/1968 Hirshfield ......................... 330/4
3,820,035 A 6/1974 Meddaugh
4,247,828 A * 1/1981 Busacca et al. ................. 331/90
4,286,192 A 8/1981 Tanabe et al.
4,382,208 A 5/1983 Meddaugh et al.
4,400,650 A * 8/1983 Giebeler, Jr. ................. 315/5.41
4,629,938 A 12/1986 Whitham
4,651,057 A 3/1987 Uetomi et al.
4,746,839 A 5/1988 Kazusa et al.
4,949,047 A * 8/1990 Hayward et al. .............. 315/505
5,039,910 A 8/1991 Moriguchi et al.
5,319,313 A * 6/1994 Vogel et al. ................... 315/500
5,381,072 A 1/1995 Tanabe
5,821,694 A 10/1998 Young
6,366,021 B1 4/2002 Meddaugh et al.
6,376,990 B1 4/2002 Allen et al.
6,407,505 B1 6/2002 Bertsche
6,465,957 B1 10/2002 Whitham et al.
6,493,424 B2 12/2002 Whitham
6,593,696 B2 7/2003 Ding et al.
6,646,383 B2 11/2003 Bertsche et al.
6,856,105 B2 2/2005 Yao et al.
6,864,633 B2 3/2005 Trail et al.
7,157,868 B2 1/2007 Brown et al.
7,239,095 B2 7/2007 Ho et al.
7,339,320 B1 3/2008 Meddaugh et al.
7,400,093 B2 7/2008 Salop et al.
7,619,363 B2 11/2009 Whittum et al.
2005/0057198 A1 3/2005 Hanna
2007/0035260 A1* 2/2007 Ho et al. ........................ 315/505
2009/0261760 A1* 10/2009 Iwata et al. ................... 315/505
2011/0074288 A1* 3/2011 Mohr et al. .................. 315/5.41

* cited by examiner

*Primary Examiner* — Douglas W Owens
*Assistant Examiner* — Jonathan Cooper
(74) *Attorney, Agent, or Firm* — Houst Consulting

(57) ABSTRACT

An energy switch assembly includes probe components that can undergo and survive elevated temperatures of a bake-out procedure, and drive components that have capabilities of continuous positioning a probe throughout the stroke of the probe. The drive components can be removable from the probe components and replaceable without breaking the vacuum of the accelerator guide assembly.

18 Claims, 5 Drawing Sheets

ENERGY SWITCH ASSEMBLY FOR LINEAR ACCELERATORS

BACKGROUND

This invention relates generally to X-ray devices and in particular to energy switch assemblies and linear accelerators incorporating the same.

X-ray apparatuses such as linear accelerators are widely used in various applications including in medical radiation therapy and imaging. For example, accelerator guides are used to accelerate electron beams which can be directed to X-ray targets to produce radiation for treatment of diseases and imaging. To produce suitable radiation profiles for particular medical applications, it is necessary to vary the energy level of electron beams incident on an X-ray target.

Energy switches have been used with accelerator guides to modulate the energy levels of output electron beams. In use, a metallic probe is inserted into a side cavity of an accelerator guide to change the mode of the side-cavity coupling at the radio frequency of accelerating cavities downstream of the side cavity. At a predetermined probe insertion depth, a desirable mode-shape is developed, resulting in a field step. The result is an energy level of an output beam controlled by the position of the metallic probe. U.S. Pat. No. 7,339,320 discloses a standing wave particle beam accelerator and an energy switch, the disclosure of which is incorporated herein by reference in its entirety.

Conventional energy switches use pneumatically driven mechanisms to control a probe end at two positions, an inserted position and a retracted position. Thus, the energies of output beams controlled by conventional energy switches are limited to two levels, a first energy level with a probe end inserted in a switch side cavity and a second energy level with the probe end retracted out of the switch side cavity.

Conventional energy switches are typically assembled to accelerator guides after a final bake-out procedure since conventional energy switches cannot survive high bake-out temperatures. Bake-out is a process in which an accelerator guide assembly is heated to elevated temperatures for a period of time and internally evacuated to outgas vacuum components in the guide assembly. In assembling a conventional energy switch, it is necessary to reopen the vacuum of an accelerator guide assembly. As a result, the vacuum integrity and cleanliness of the accelerator guide assembly would be compromised.

SUMMARY

The present invention provides energy switch assemblies that can be used with linear accelerators to modulate the energy levels of output electron beams. The energy switch assemblies include probe components that can undergo and survive elevated temperatures of a bake-out procedure, and drive components that have capabilities of continuous positioning of a probe throughout the stroke of the probe. The drive components can be removable from the probe components and replaceable without breaking the vacuum of the accelerator guide assembly.

In one embodiment, an energy switch assembly comprises a probe assembly comprising a probe having an end portion, and a drive assembly adapted to be removably coupled to the probe assembly. The drive assembly is operable to move the probe to position the end portion. Preferably the probe assembly is adapted to undergo a bake-out procedure with the accelerator guide.

In some embodiments, the probe assembly comprises precision balls for guiding movement of the probe. The probe may include grooves on the outer surface to engage the precision balls to allow the probe axially moving relative to the precision balls. The probe assembly may also include a spring member engaging a precision ball to allow the probe to be compliant in a radial direction.

The drive assembly preferably includes a servo motor controllable by a computer. Preferably, the drive assembly is adapted to position the end portion of the probe at any of selected positions throughout a travel range of the probe. The drive assembly can be coupled to the probe assembly after a bake-out procedure for an accelerator guide mounted with the probe assembly.

In another aspect, a linear accelerator includes an accelerator guide having at least one side cavity, and an energy switch assembly coupled to the at least one side cavity. The energy switch includes a probe assembly comprising a probe and a drive assembly removably coupled to the probe assembly adapted to move the probe to position the end portion of the probe in the at least one side cavity.

In a further aspect, a method of manufacturing an accelerator guide includes the steps of providing a probe-guide assembly comprising an accelerator guide having a side cavity and a probe assembly coupled to the side cavity, and performing a bake-out procedure for the probe-guide assembly. A drive assembly may be removably coupled to the probe assembly after the bake-out procedure. The bake-out procedure can be performed at an elevated temperature of 450° C. or greater and/or a pressure of $1\times10^{-9}$ torr or lower.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION OF VARIOUS EMBODIMENTS

Various embodiments of target assemblies are described. It is to be understood that the invention is not limited to the particular embodiments described as such may, of course, vary. An aspect described in conjunction with a particular embodiment is not necessarily limited to that embodiment and can be practiced in any other embodiments. For instance, while various embodiments are described in connection with linear electron accelerators for production of X-rays and electron beams, it will be appreciated that the invention can also be practiced in other electromagnetic apparatuses and modalities. It is also to be understood that the terminology used herein is for the purpose of describing particular embodiments only, and is not intended to be limiting since the scope of the invention will be limited only by the appended claims, along with the full scope of equivalents to which such claims are entitled.

In addition, various embodiments are described with reference to the figures. It should be noted that the figures are not drawn to scale, and are only intended to facilitate the description of specific embodiments. They are not intended as an exhaustive description or as a limitation on the scope of the invention.

All technical and scientific terms used herein have the same meaning as commonly understood by one of ordinary skill in the art to which this invention belongs, unless defined otherwise. Various relative terms are used in the description and appended claims such as "on," "upper," "above," "over," "under," "top," "bottom," "higher," and "lower" etc. These relative terms are defined with respect to the conventional plane or surface being on the top surface of the structure, regardless of the orientation of the structure, and do not necessarily represent an orientation used during manufacture or use. The following detailed description is, therefore, not to be taken in a limiting sense. As used in the description and appended claims, the singular forms of "a," "an," and "the" include plural references unless the context clearly dictates otherwise.

Figure 1:
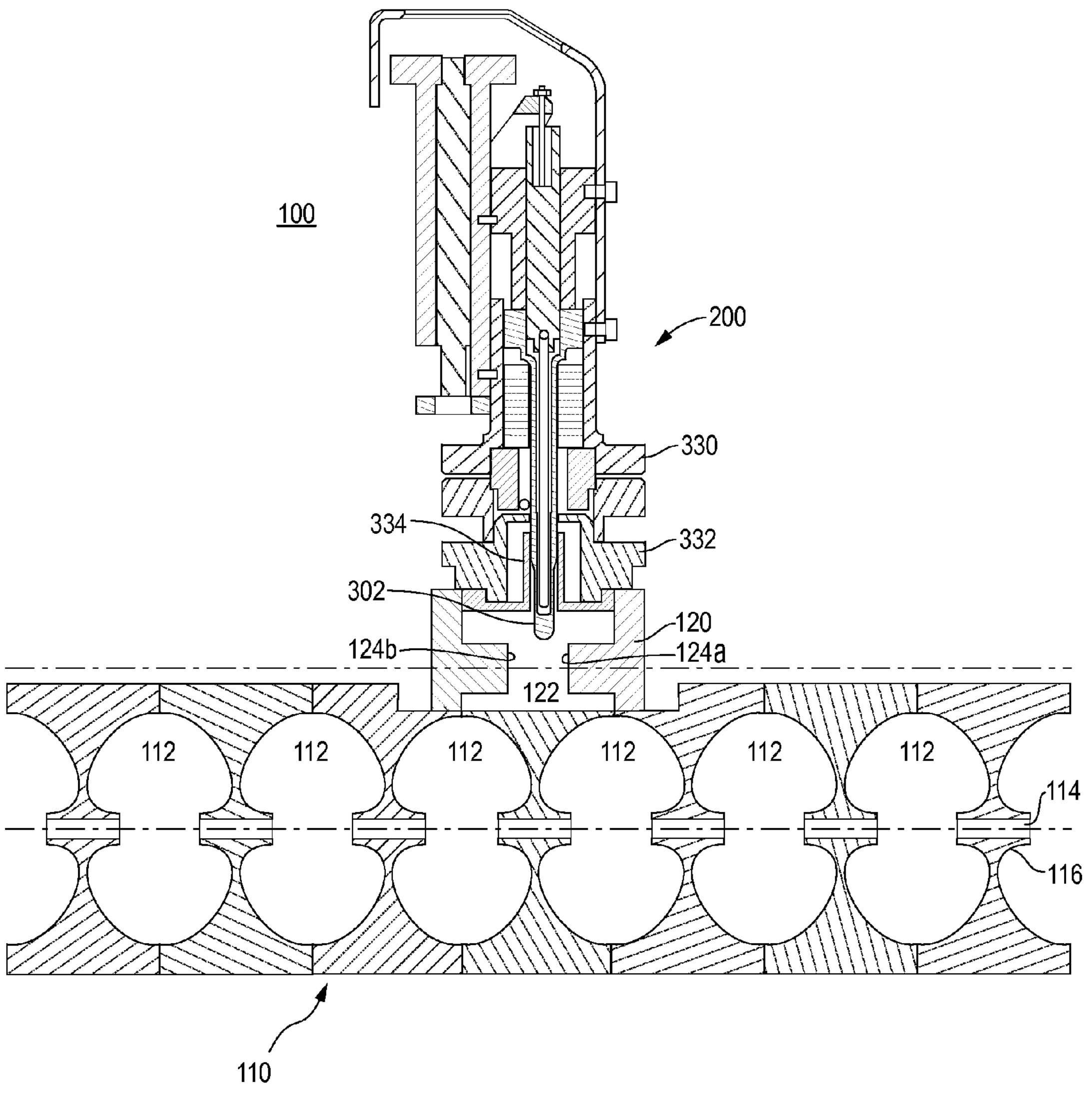
FIG. 1 is a partial cross-sectional view of a linear accelerator including an energy switch assembly in accordance with some embodiments of the invention.

FIG. 1 shows a partial cross-sectional view of a linear accelerator 100 in accordance with some embodiments of the invention. In general the accelerator 100 includes an accelerator guide 110 and an energy switch assembly 200 mounted to the accelerator guide 110. The accelerator guide 110 comprises a chain of accelerating cavities 112 that are electromagnetically coupled to each other. The accelerating cavities 112 are aligned to permit passage of electron beams through a beam axis aperture 114. The accelerating cavities 112 include projecting noses 116 adapted to improve efficiency of interaction of microwave power and electron beams. The accelerator also includes a plurality of coupling bodies (not shown) each of which has a coupling cavity that couples two neighboring accelerating cavities 112.

The accelerator 100 includes a body 120 mounted to the accelerator guide 110. The body 120 has a cavity 122 ("switch side cavity") that electromagnetically couples two adjacent accelerating cavities through respective apertures (not shown). The body 120 may include a pair of projecting noses 124*a*, 124*b* each extends axially into the cavity 122.

The energy switch assembly 200 is mounted to the accelerator guide 110 via body 120. A probe 302 of the energy switch assembly 200 can be inserted or partially inserted into or out of the cavity 122. The insertion of the probe 302 into the switch side cavity 122 changes the geometry of the cavity 122, including the distances between the probe 302 and the noses 124*a*, 124*b*, thereby altering the electromagnetic fields which couple to the respective apertures and adjacent accelerating cavities. This in turn alters the energy level of the electron beam downstream from the energy switch assembly 200.

FIGS. 2A, 2B, 2C, and 2D illustrate an exemplary energy switch assembly 200 according to some embodiments of this invention. In general the energy switch assembly 200 includes a probe assembly 300 and a drive assembly 400. The probe assembly 300 includes a probe 302 such as a copper probe or other metallic probe. The probe assembly or vacuum assembly 300 may also include a housing to enclose the probe and bellows to contain vacuum as will be described in more detail below. The drive assembly 400 is adapted to move or position the probe 302 in the switch side cavity 122. The drive assembly 400 can be coupled to the probe assembly 300 e.g. via a structure 350 without the need to open the vacuum of the accelerator guide assembly 110. Conversely, the drive assembly 400 can be removed from the probe assembly 300 without breaking the vacuum of the accelerator guide assembly 110. Thus, in some embodiments, the probe assembly 300 may be mounted to the accelerator guide 110 before a bake-out procedure, and undergoes a bake-out procedure together with the accelerator guide 110. The drive assembly 400 may be attached to the probe assembly 300 after the bake-out procedure. By way of example, a bake-out procedure may involve heating an accelerator guide assembly at elevated temperatures such as e.g. 450° C. or greater or lower for a substantial period of time such as e.g. 30 hours, and/or internally evacuating the assembly to high vacuum such as e.g. $1.0\times10^{-9}$ torr. One of the advantages of the two-piece design of the energy switch assembly 200 of the invention is that the drive assembly 400 can be built and tested as an independent component before assembling to the probe assembly 300 and accelerator guide 110. The probe assembly 300 can withstand elevated temperatures, and undergo a bake-out procedure with the accelerator guide 110, thus eliminating the need for reopening the guide assembly 110 for assembling the energy switch 200. As such, the vacuum integrity and cleanliness of the accelerator guide assembly 110 can be maintained. As used herein or hereafter, the phrase "withstanding elevated temperatures or high vacuum" means that the probe assembly can still function properly after a bake-out procedure at elevated temperatures and/or high vacuum. By way of example, no substantial sticking, leaking, damage to the probe parts, or diffusion bonding would occur after such a bake-out procedure. As used herein the term "bakable probe assembly" or "bakable energy switch assembly" refers to a probe assembly or an energy switch assembly that can go through a bake-out procedure and still function properly.

The probe assembly 300 includes a body member 304 having a housing in which a probe 302 is disposed. The probe 302 may be a copper probe or other metallic probe having a geometric size or cross-section. For example, the probe 302 may have a circular cross-section, or have a tapered end portion. Other geometric sizes or shapes of the probe 302 are possible and contemplated by the present invention. The probe 302 includes a first portion 302*a*, a second portion 302*b*, and a joint portion 302*c*. A recess 306 can be machined at an end of the first portion 302*a* and is configured to receive a connector 308, which couples the probe 302 with the drive assembly 400 via structure 350. An elongate channel or lumen 310 can be machined in the second portion 302*b*. A tubular member 312 having a passageway 314 may be disposed in the elongate lumen 310. The tubular member 312 and the elongate lumen 310 serve to circulate a cooling fluid to dissipate heat generated during operation of the energy switch. The tubular member 312 may be connected to a source of a cooling fluid via an inlet 316 machined in the joint portion 302*c*. An outlet 318 in the joint portion 302*c* allows the circulated cooling fluid to flow out of the probe 302. Thus, in operation, a cooling fluid enters the passageway 314 of tubular member 312 via inlet 316, flows out of the tubular member 312, and enters the elongate lumen 310. The cooling fluid flows back along the elongate lumen 310 and out of the probe via outlet 318. A continuous flow of a cooling fluid in the passageway 314 and the lumen 310 allows the probe 302 to be continuously cooled during operation. Manifolds 320 provide input and output of a cooling fluid. The positions of the input and output of the cooling fluid within the travel stroke of the probe assembly 300 reduces the overall height of the energy switch assembly 200.

In alternative embodiments, the concentric passageway 314 and elongate lumen 310 may be machined in a single piece of a probe member. One piece probe assembly may advantageously reduce part count, eliminate the need for multiple-step brazing process, and improve the radial accuracy and the overall straightness of the probe assembly. Reducing the part count is desirable in reducing the tolerance stack up and improving assembly reliability. In further alternative embodiments, the probe **302*b*** has a solid cross-section and does not have an elongate lumen for a cooling fluid.

A bellow member 322 is coupled to the probe 302 and the body member 304 to provide vacuum seal for the probe 302. The bellow member 322 can be made of any suitable materials, and preferably made of materials that can withstand elevated temperatures and have good welding properties. By way of example, the bellow member 322 can be constructed with stainless steel such as AM 350. It has been tested that a bellow made of AM 350 can last for 50 years of clinical cycling along with two or more bake-out cycles. Other metals or metal alloys that maintain their strength after heat treatment can also be used. The bellow member 322 may be coupled to the probe 302 and body member 304 by any suitable means such as by welding known in the art.

Figure 2A:
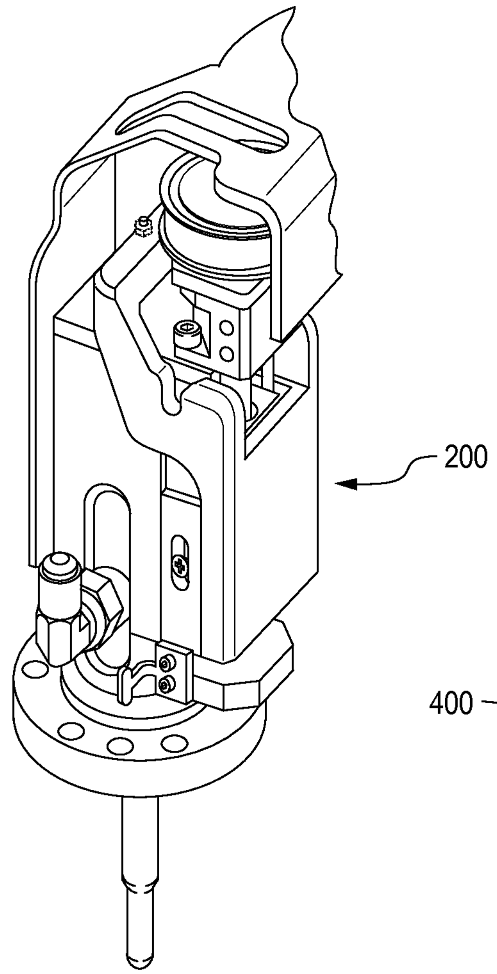
FIG. 2A is a perspective view of an energy switch assembly in accordance with some embodiments of the invention.
Figure 2B:
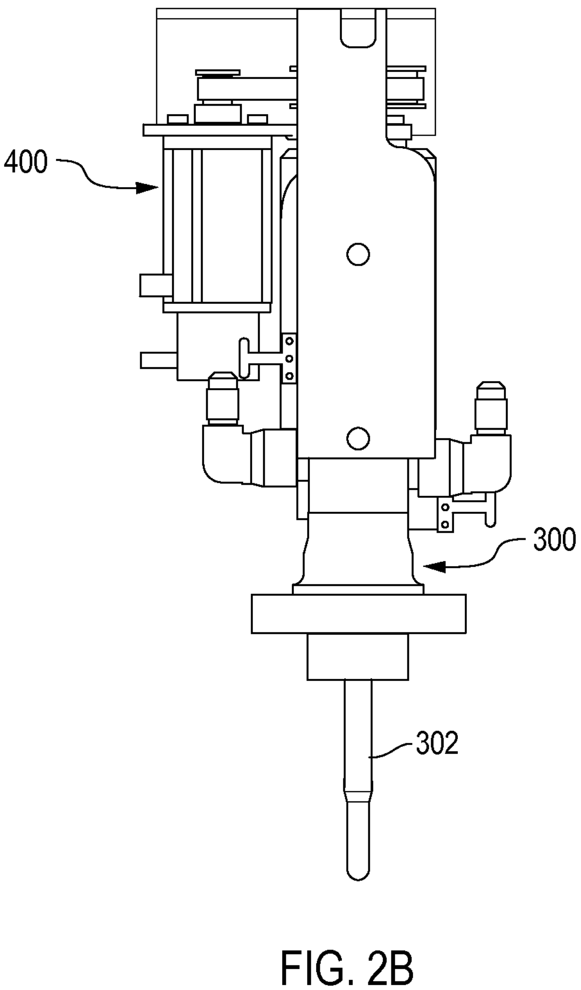
FIG. 2B is a side view of an energy switch assembly in accordance with some embodiments of the invention.
Figure 2C:
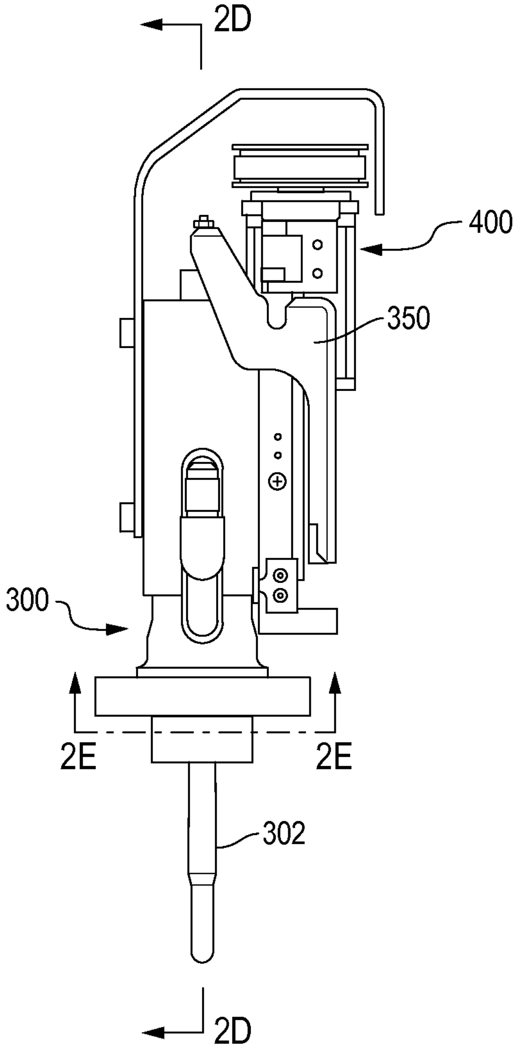
FIG. 2C is another side view of an energy switch assembly in accordance with some embodiments of the invention.
Figure 2D:
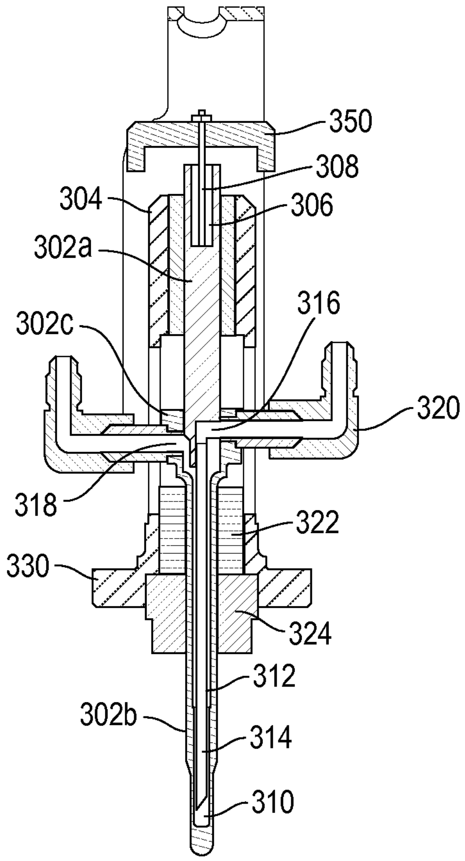
FIG. 2D is a cross-sectional view of an energy switch assembly along line 2D-2D of FIG. 2C in accordance with some embodiments of the invention.
Figure 2E:
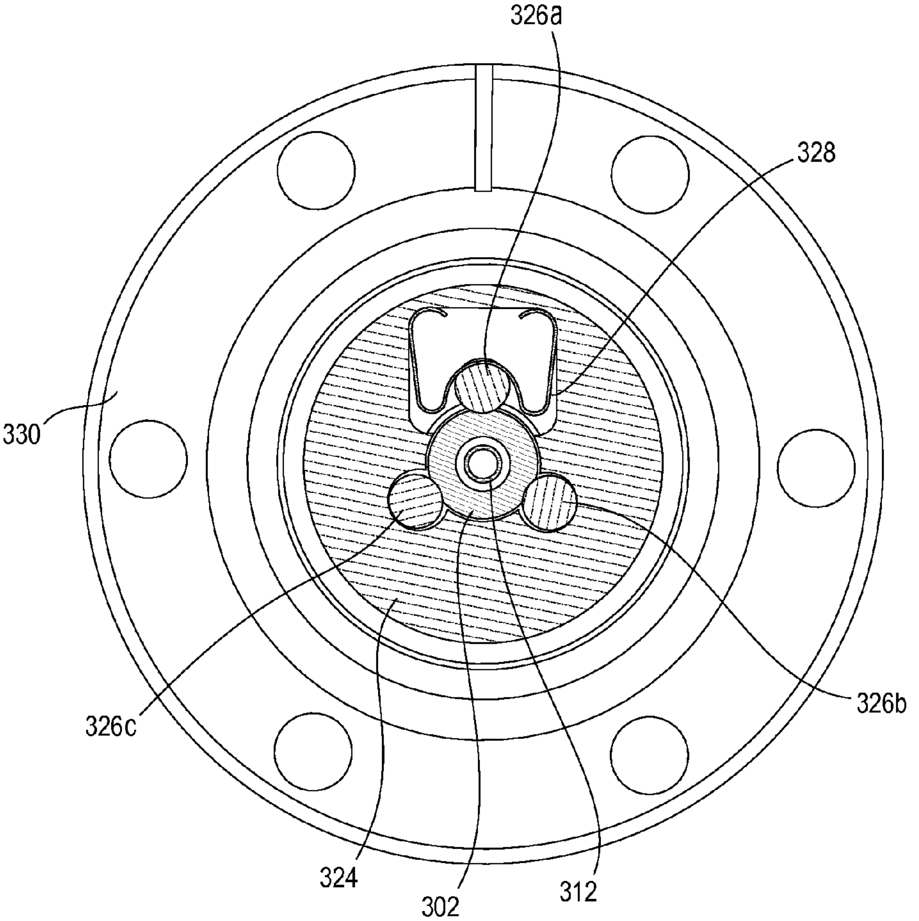
FIG. 2E is a cross-sectional view of an energy switch assembly along line 2E-2E of FIG. 2C in accordance with some embodiments of the invention.
Figure 3A:
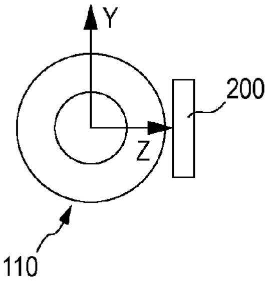
FIGS. 3A-3B are schematic diagrams illustrating alignment axes of an energy switch assembly with respect to an accelerator guide in accordance with some embodiments of the invention.
Figure 3B:
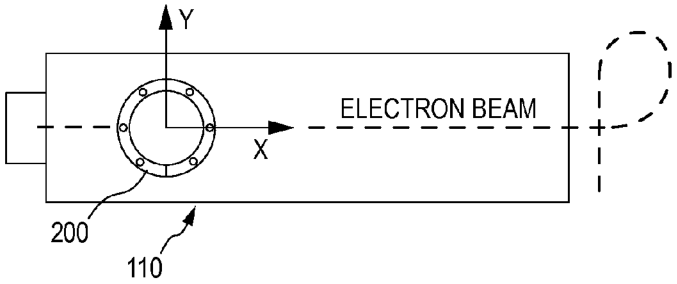

A guide member 324 guides the movement of the probe 302. In some embodiments, the guide member 324 includes precision balls **326*a*, 326*b*, 326*c* (FIG. 2E) to align the probe 302 relative to the accelerator guide axes. Elongate channels may be machined in the guide member 324 to receive and guide the movement of the precision balls 326. Longitudinal grooves may be machined on the circumferential surface of the probe 302 to engage the precision balls 326 and allow the probe 302 to axially move relative to the balls 326. In some embodiments, a cut-out may be provided in the guide member 324 for disposing a spring member or flexure 328. The spring member 328 may apply against a precision ball such as 326*a* and the guide member 324 to allow the probe 302 to be compliant in one direction. Preferably, the probe 302 is assembled or aligned to be rigidly or fixedly positioned along the electron beam direction using the precision balls such as 326*b*, 326*c*, or to be compliant in the direction perpendicular to the electron beam direction using the spring member 328 and a precision ball such as 326*a*. As illustrated in FIGS. 3A-3B, the accelerator guide 110 has an X-axis along the electron beam, a Y-axis perpendicular to the beam, and a Z-axis along the probe insertion direction which is perpendicular to the X-Y plane. Generally the accelerator guide 110 is very sensitive to the movement of the probe 302 in the direction of the beam (X-axis), but much less sensitive to movement in the direction perpendicular to the beam (Y-axis). Therefore, it would be desirable to align the compliant direction with the Y-axis and rigidly position the probe 302** in the X-axis.

The spring member or flexure 328 is preferably constructed with materials that can withstand elevated bake-out temperatures without losing its spring temper. By way of example, Nickel-Chromium alloys such as Inconel ×750 can withstand temperatures up to 700° C. without losing its spring temper. Other metals or metal alloys may also be used. The precision balls 326 can be made of tungsten carbide or other dense materials that can withstand elevated bake-out temperatures.

In alternative embodiments, the probe assembly does not include precision balls and spring members. Elimination of the spring, balls and machined grooves reduces the part count, and thus improves the assembly reliability. The movement of the probe may be guided by a bushing such as a ceramic bushing. A ceramic bushing may advantageously prevent the probe from crushing at elevated temperatures.

Returning to FIG. 1, the probe assembly 300 can be mounted to the accelerator guide 110 e.g. via flanges 330, 332. Preferably conflat flanges having mating surfaces are used to provide good vacuum seal and perpendicularity of the probe assembly to the accelerator guide. Bushings 334 can be used at the end of probe travel to maintain the radial position accuracy of the probe 302. Preferably, bushings 334 are made of ceramics to reduce part count and improve radial accuracy. Ceramic bushings also make the probe assembly less susceptible to handling damages.

Advantageously, the end portion of the probe 302 can be continuously positioned inside the switch side cavity 122. This is a significant improvement over conventional energy switches which typically control a probe end portion at only two positions, an inserted position and a retracted position. The continuous positioning throughout the probe stroke is accomplished in part by the drive assembly 400 as will be described in more detail below. Continuous position selection of the probe 302 inside the switch side cavity 122 enables the accelerator guide 110 to produce a greater number of energy levels of electron beams, which are desirable for medical applications. In some embodiments, the probe 302 may have a full travel range of e.g. 30 mm or greater, or the end portion of the probe 302 may have a travel range of e.g. 25 mm or greater in the side cavity 122. The extended travel range of the probe 302 in the switch side cavity 122 would allow for more design flexibility in accelerator designs and more design margin on travel requirements.

Advantageously, the probe assembly 300 of the invention is constructed such to undergo and survive a bake-out procedure. No sticking, leaking, damage to the probe parts, or diffusion bonding was found after a 32 hour bake-out procedure at elevated temperatures of 450° C. and vacuum of $1\times10^{-9}$ torr. The probe assembly 300 remained vacuum tight after cycling for the equivalent of 20 years of clinical life. The probe assembly greatly improves the reliability and reduces contamination of internal guide assemblies. The straightness of probe assemblies is also improved with thermal expansion tooling that holds overall straightness to 0.18 mm (0.007") or less. Manual straightening is not required for the probe assembly.

Figure 4A:
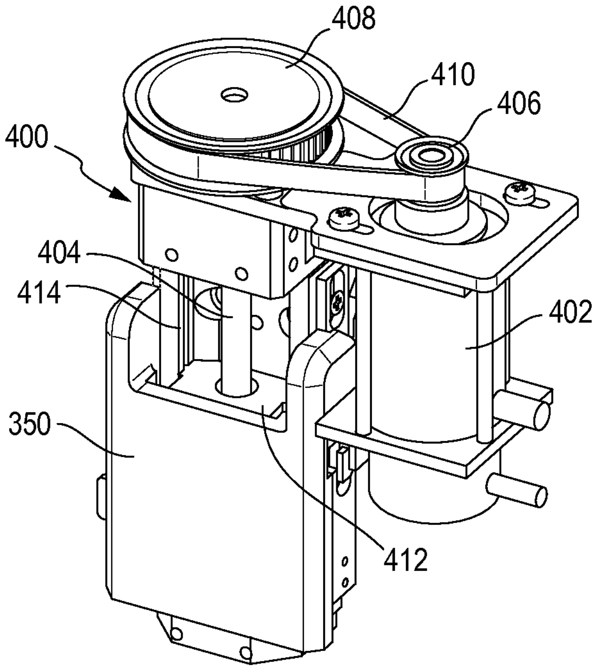
FIGS. 4A-4B are perspective views of a drive assembly in accordance with some embodiments of the invention.
Figure 4B:
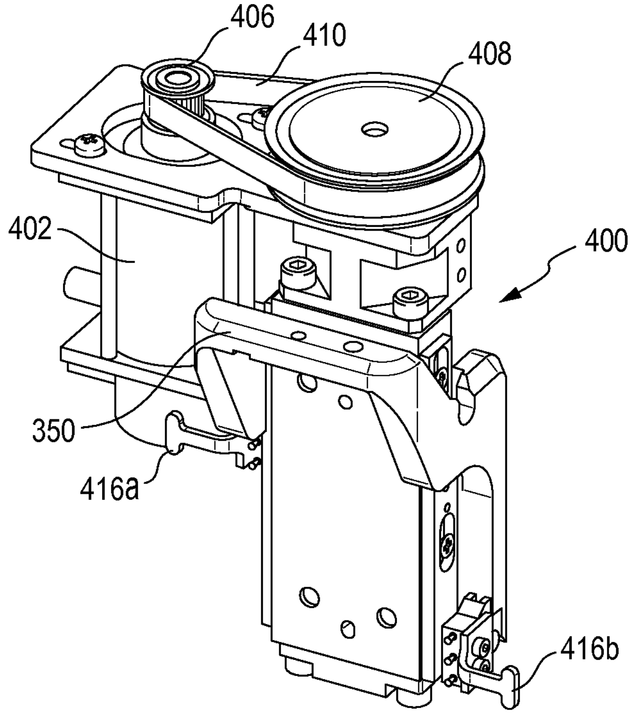

FIG. 4A-4B shows a drive assembly 400 in accordance with some embodiments of the invention. In general the drive assembly 400 includes a mechanism that provides a force to move the probe 302 in a linear direction. For example, the drive assembly 400 may include a motor 402 which provides a rotation force, and a ball screw 404 which transmits a rotation force to a linear force. A carrier structure 350 is engaged with the ball screw 404 and linearly moves as the ball screw 404 rotates, thereby providing a force to linearly move the probe 302 which is coupled to the carrier structure 350. It should be noted that other type of motors such as linear motors may also be used. Preferably, the motor is a servo motor electrically connected to a controller and is operable with user interface software. A close loop control can be used to continuously move and position the probe end at any desirable depth in the switch side cavity.

In the exemplary embodiment shown in FIG. 4A-4B, the drive assembly 400 includes pulleys 406, 408 and a timing belt 410 winding around the pulleys 406, 408. The ball screw 404 is engaged with pulley 408 e.g. via a coupler (not shown). A stage member 412 is fixed to or otherwise engaged with the ball screw 404 and moves linearly as the ball screw 404 rotates. The carrier structure 350 is attached to the stage member 412 e.g. by screws etc. Guide rails 414 define the linear movement of the stage member 406 and carrier structure 350. Slide guides (not shown) or other suitable mechanisms can be used to engage the stage member 406 with the guide rails 414. Therefore, when actuated, the motor 402 drives the pulley 406 to turn, which transmits the rotation force to the timing belt 410. The timing belt 410 engages and rotates pulley 408. The rotation of pulley 408 rotates the ball screw 404, which in turn moves the stage member 412 and the carrier structure 350 in a linear direction along the guide rails 414. The probe 302, which is coupled to the carrier structure 350 via a connector 308 (FIG. 2D), moves with the carrier structure 350 in a linear direction. A resolver or sensor can be coupled to the motor 402 to provide primary feedback on the position of the ball screw 404. Limit switches 416*a*, 416*b* may be provided at each end of travel of the carrier structure 350. The limit switches 416*a*, 416*b* signal a controller to slow down the motion near the end of travel and therefore prevent damage to the system.

It should be appreciated that while an exemplary rotary motor is described for the drive assembly, any mechanism that can move the probe in a linear direction can be used including such as linear motors or flat motors. For example, the use of a flat motor in the drive assembly may eliminate pulleys, timing belts, stage members, other machine parts, and their inaccuracies. The overall reliability of the assembly would improve.

Advantageously, the drive assembly 400 can accurately position the probe 302 in the switch side cavity 122, thus reducing the amount of test time required. For example, the drive assembly 400 may employ a precision ball screw to provide a probe position accuracy of +/−0.2 mm and a repeatability of +/−0.012 mm for all energy levels. Further, the drive assembly 400 provides continuous positioning capabilities for the probe throughout the probe's travel range in the switch side cavity 122, allowing production of multiple energy levels of output beams using a single probe device.

An energy switch assembly has been described. Those skilled in the art will appreciate that various other modifications may be made within the spirit and scope of the invention. All these or other variations and modifications are contemplated by the inventors and within the scope of the invention.

What is claimed is:

1. An energy switch assembly, comprising:

a probe assembly comprising a probe having an end portion; and a drive assembly adapted to be removably coupled to the probe assembly, said drive assembly being operable to move the probe to position the end portion to modulate energy levels of electron beams;

wherein the drive assembly is operable to place the end portion of the probe at a first end location to modulate the electron beams to a first energy level, a second end location to modulate the electron beams to a second energy level, the first and second end locations defining a travel range of the end portion of the probe; and wherein the drive assembly comprises a servo motor controllable by a computer and is further operable to continuously place the end portion of the probe at additional locations between the first and second end locations and wherein the probe is further maintained at the additional locations to modulate the electron beams to additional energy levels.

2. The energy switch assembly of claim 1 wherein said probe assembly is adapted to be mounted to an accelerator guide to undergo a bake-out procedure with the accelerator guide.

3. The energy switch assembly of claim 1 wherein said probe assembly comprises a material that withstands an elevated temperature of 450° C. or greater and a pressure of $1\times10^{-9}$ torr or lower.

4. The energy switch assembly of claim 1 wherein the end portion of the probe has a range of travel equal to or greater than 30 mm.

5. The energy switch assembly of claim 1 wherein said probe assembly further comprises a guide member and precision balls for guiding movement of the probe, said guide member is provided with one or more elongate channels configured to receive one or more of the precision balls, and said probe comprises elongate grooves on an outer surface of the probe, wherein the elongate channels in the guide member and the elongate grooves in the probe are adapted to engage the precision balls to allow the probe axially moving relative to the precision balls.

6. The energy switch assembly of claim 5 wherein said probe assembly further comprises a spring member in the guide member directly engaging a precision ball to allow the probe to be compliant in a radial direction.

7. The energy switch assembly of claim 1 wherein said drive assembly is adapted to be coupled to the probe assembly after a bake-out procedure of an accelerator guide mounted with the probe assembly.

8. A linear accelerator comprising:

an accelerator guide configured to produce electron beams, the accelerator guide having at least one side cavity; and an energy switch assembly configured to modulate energy levels of the electron beams produced by the accelerator guide; the energy switch assembly comprising a probe assembly and a drive assembly, said probe assembly being coupled to the at least one side cavity of the accelerator guide and comprising a probe having an end portion, said drive assembly being removably coupled to the probe assembly adapted to move the probe to position the end portion of the probe in the at least one side cavity;

wherein the drive assembly is operable to place the end portion of the probe at a first end location to allow the accelerator guide to produce an electron beam having a first energy level, a second end location to allow the accelerator guide to produce an electron beam having a second energy level, the first and second end locations defining a travel range of the end portion of the probe; and wherein the drive assembly comprises a servo motor controllable by a computer and is further operable to continuously place the end portion of the probe at additional locations between the first and second end locations and wherein the probe is further maintained at the additional locations to allow the accelerator guide to produce electron beams having additional energy levels.

9. The linear accelerator of claim 8 wherein said end portion of the probe has a travel range equal to or greater than 25 mm in the at least one side cavity.

10. The linear accelerator of claim 8 wherein said probe assembly further comprises a guide member and precision balls for guiding movement of the probe, said guide member is provided with one or more elongate channels configured to receive one or more of the precision balls, and said probe comprises elongate grooves on an outer surface of the probe, wherein the elongate channels in the guide member and the elongate grooves in the probe are adapted to engage the precision balls to allow the probe axially moving relative to the precision balls.

11. The linear accelerator of claim 10 wherein said probe assembly further comprises a spring member in the guide member directly engaging a precision ball to allow the probe to be compliant in a radial direction.

12. The linear accelerator of claim 11 wherein said compliant direction is perpendicular to a longitudinal axis of the accelerator guide.

13. The linear accelerator of claim 8 wherein said probe assembly comprises a bushing for guiding movement of the probe.

14. A method, comprising the steps of:

providing a probe-guide assembly comprising an accelerator guide having a side cavity and a probe assembly coupled to the side cavity, said probe assembly comprising a probe movable in the side cavity; and performing a bake-out procedure on the probe-guide assembly;

wherein the probe-guide assembly including the probe is subjected to the bake-out procedure.

15. The method of claim 14 further comprising the step of coupling a drive assembly to the probe assembly after the bake-out procedure, said drive assembly being adapted to move the probe in the side cavity.

16. The method of claim 14 wherein said bake-out procedure is performed at an elevated temperature of about 450° C. or greater and/or a pressure of about $1\times10^{-9}$ torr or lower.

17. The energy switch assembly of claim 1 wherein said probe assembly is bakable to withstand a bake-out procedure.

18. The linear accelerator of claim 8 wherein said probe assembly is bakable to withstand a bake-out procedure.

* * * * *